Mar. 27, 1923.
R. LAUPITZ
1,449,823
TRANSFER MECHANISM FOR ADDING AND SUBTRACTING MACHINES
Original Filed Apr. 14, 1920
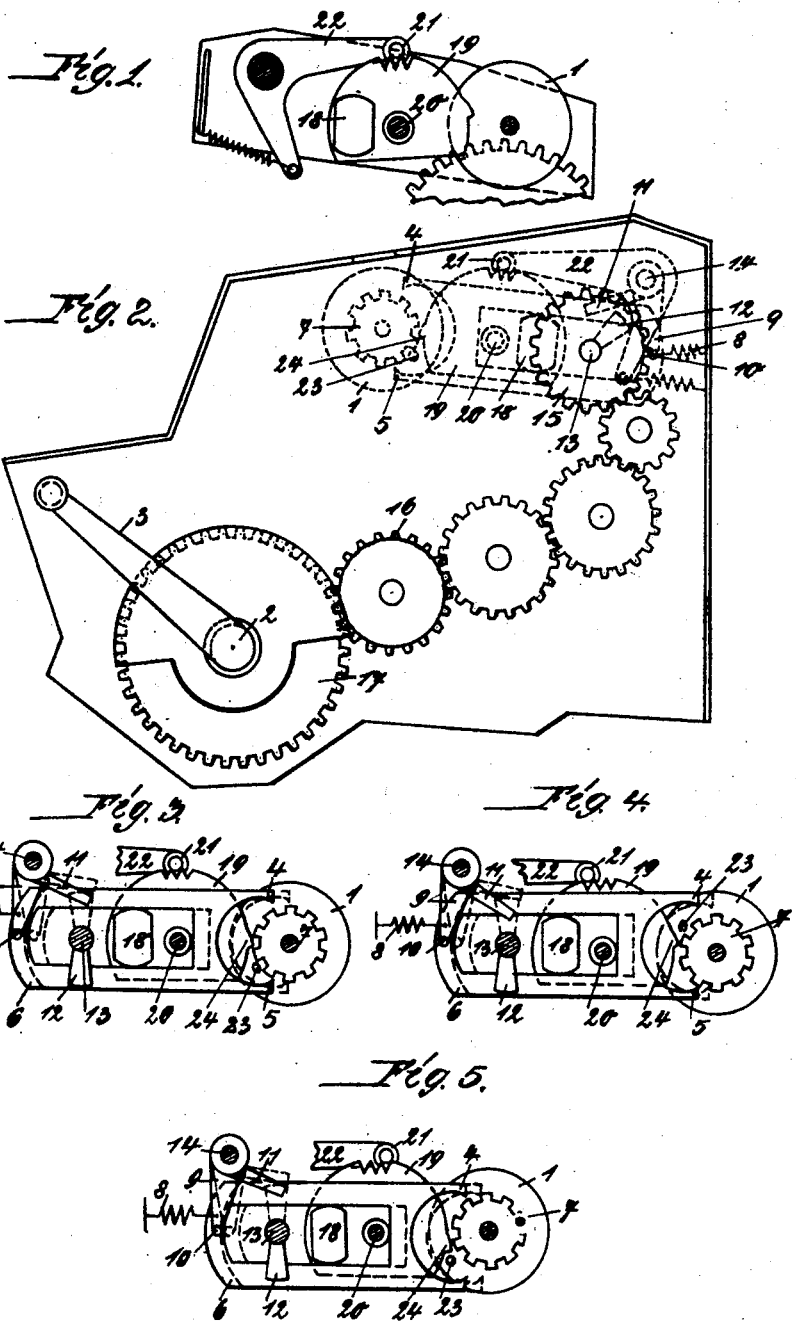
Inventor:
Robert Laupitz.
By B. Singer
Atty.

Patented Mar. 27, 1923.

1,449,823

UNITED STATES PATENT OFFICE.

ROBERT LAUPITZ, OF DRESDEN-RADEBEUL, GERMANY.

TRANSFER MECHANISM FOR ADDING AND SUBTRACTING MACHINES.

Original application filed April 14, 1920, Serial No. 373,883. Divided and this application filed January 24, 1922. Serial No. 536,397.

*To all whom it may concern:*

Be it known that I, ROBERT LAUPITZ, a citizen of the German Republic, and residing at Dresden-Radebeul, Germany, have invented certain new and useful Improvements in Transfer Mechanism for Adding and Subtracting Machines (for which I have filed applications for patents in Germany L–44,316 IX/42m, July 9, 1916, and L–47,443 IX/42m, November 22, 1918), of which the following is a specification.

The present invention relates to a transfer-mechanism for adding and subtracting machines of the kind in which the numerals, set up by means of keys, are added or subtracted from the numeral appearing on a totalizing counter, by the rotation of a shaft.

The invention consists in the various details of construction and combination of parts as hereinafter set forth and claimed with reference to the accompanying drawings.

This is a division of application filed April 14, 1920 containing Serial No. 373,-883.

Fig. 1 representing a view of the device for preparing the transfer,

Fig. 2, a view of the wheel train for effecting the transfer, and

Figs. 3 to 5, views showing the transferring device in different positions.

The machine has a totalizing counter composed of numeral wheels 1 which receive motion, in known manner by a mechanism which is set by means of keys for the extent of motion and by means of a lever for the direction of motion according to whether the operation is one of addition or subtraction. The actuation of the mechanism, when set, is effected by the rotation of a shaft 2 by means of a handle 3.

According to the invention the transfer of the tens in either direction is effected by means of pawl teeth 4 and 5 formed on a frame 6 of which there is one for each numeral wheel affected. The teeth 4 and 5 act on a toothed wheel 7 connected to the wheel 1. The frame 6 is reciprocated by a spring 8 and by a bell-crank lever one arm 9 of which is pivoted at 10 to the frame, the other arm 11 being adapted to co-operate with a cam 12 on a shaft 13. The bell-crank levers are arranged on a shaft 14. The cams 12 are arranged spirally on the shaft 13 which is driven by a train of wheels shown in Fig. 2. The wheel 15 is secured to the cam shaft, and the first wheel 16 of the train meshes with a wheel 17 on the shaft 2. The frame 6 has a slot by means of which it is guided on a block or roller 18 connected to a disk 19 rotatably arranged on a shaft 20. A roller 21 at the free end of a spring-actuated lever 22, arranged on the shaft 14, is adapted to engage one of three notches in the disk 19 for holding the latter in one of three positions. The centre position (Fig. 3) is the normal one and in this position the guide element 18 holds the frame so that its reciprocation leaves the numeral wheels unaffected. When a transfer is to take place, a stud 23 on the numeral wheel of the next smaller denomination contacts with a lug 24 on the disk 19 and turns this in one or the other direction depending on the nature of the calculating operation. The lever 22 holds the disc in the new position as indicated in Figs. 4 and 5, one showing the position for addition and the other for subtraction. The actuation of the disk 19 and of the guide element 18 causes the front end of the frame 6 to be either raised or lowered so that one of the teeth 4, 5 will act on the wheel 7 and turn the numeral wheel one space when the frame is reciprocated. As the frame returns under the influence of the spring, its tooth, riding on the wheel tooth it has to pass, forces the frame and disk 19 to be restored to the neutral position.

Having now particularly described and ascertained the nature of my said invention and the manner in which the same is to be performed, I declare that what I claim is:—

A transfer mechanism for calculating machines comprising, in combination with numeral wheels, each having an eccentrically arranged pin on one side, and a toothed wheel connected to each numeral wheel; an operating shaft, a frame arranged for reciprocating movement and for oscillating movement, said shaft having means to move said frame in one direction and said frame having teeth spaced apart and arranged on opposite sides of said toothed wheel, so that said wheel may be engaged by either of said teeth, a rotatably mounted disk having a lug arranged to be engaged by the pin of the numeral wheel of the next smaller denomination, and also having an eccentrically arranged block on one side, and forming a guide element for said frame, a spring-operated element to lock said disc in either of three positions, and a bell crank lever, having one arm pivotally connected to the said frame and provided with a spring to move said frame in the reverse direction, and a train wheel driven shaft having a cam to cooperate with the other arm of said bell crank lever.

In testimony wherof I affix my signature in presence of two witnesses.

ROBERT LAUPITZ.

Witnesses:
    Dr. Gaudes Roeller,
    H. Lehmann.